(12) United States Patent
Chu et al.

(10) Patent No.: US 8,351,457 B2
(45) Date of Patent: Jan. 8, 2013

(54) METHOD AND SYSTEM FOR PROVIDING A PRIORITY-BASED, LOW-COLLISION DISTRIBUTED COORDINATION FUNCTION USING A SUPER-FRAME STRUCTURE

(75) Inventors: Liwen Chu, San Jose, CA (US); Mario Valerio Filauro, Albany, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 13/351,153

(22) Filed: Jan. 16, 2012

(65) Prior Publication Data

US 2012/0120796 A1  May 17, 2012

Related U.S. Application Data

(62) Division of application No. 10/954,660, filed on Sep. 30, 2004, now Pat. No. 8,098,666.

(60) Provisional application No. 60/600,885, filed on Aug. 12, 2004.

(51) Int. Cl.
*H04L 12/413* (2006.01)
(52) U.S. Cl. ........................................ 370/445; 370/448
(58) Field of Classification Search .................. 370/310, 370/338, 348, 328, 329, 341, 445–448; 455/422.1, 455/450, 452.1, 453
See application file for complete search history.

(56) References Cited

U.S. PATENT DOCUMENTS

| | | | |
|---|---|---|---|
| 6,775,231 B1 | 8/2004 | Baker et al. | |
| 6,990,116 B1 | 1/2006 | Young et al. | |
| 2002/0085582 A1* | 7/2002 | Kim | 370/445 |
| 2004/0004973 A1* | 1/2004 | Lee | 370/445 |
| 2004/0146007 A1 | 7/2004 | Saadawi et al. | |
| 2005/0036475 A1 | 2/2005 | Nishiyama et al. | |
| 2005/0037771 A1 | 2/2005 | Tiedemann et al. | |
| 2005/0128988 A1 | 6/2005 | Simpson et al. | |
| 2005/0136833 A1* | 6/2005 | Emeott et al. | 455/11.1 |
| 2005/0138451 A1* | 6/2005 | Simpson et al. | 713/320 |
| 2005/0271076 A1* | 12/2005 | Ganti et al. | 370/448 |
| 2006/0050742 A1* | 3/2006 | Grandhi et al. | 370/506 |
| 2008/0176592 A1* | 7/2008 | Kakumaru et al. | 455/512 |

* cited by examiner

*Primary Examiner* — Ajit Patel
(74) *Attorney, Agent, or Firm* — Munck Wilson Mandala, LLP

(57) ABSTRACT

A method for providing a priority-based, low-collision distributed coordination function (DCF) in a wireless network is provided. The network includes an access point and a plurality of stations. The method includes receiving at a first station a super-frame from the access point. The super-frame is operable to define a service period for each of the stations. A priority for the first station is determined based on the super-frame. A back-off time is selected for the first station based on the priority.

20 Claims, 4 Drawing Sheets

METHOD AND SYSTEM FOR PROVIDING A PRIORITY-BASED, LOW-COLLISION DISTRIBUTED COORDINATION FUNCTION USING A SUPER-FRAME STRUCTURE

CROSS-REFERENCE TO RELATED APPLICATIONS

This application is a divisional of prior U.S. patent application Ser. No. 10/954,660, filed on Sep. 30, 2004 which is now U.S. Pat. No. 8,098,666 issued Jan. 17, 2012, which claims priority under 35 U.S.C. Section 119(e) to U.S. Provisional Patent Application No. 60/600,885, filed Aug. 12, 2004, which are hereby incorporated by reference.

TECHNICAL FIELD OF THE INVENTION

The present invention is directed in general to wireless area networks and, more specifically, to a method and system for providing a priority-based, low-collision distributed coordination function.

BACKGROUND OF THE INVENTION

The IEEE 802.11 WLAN is one of the most deployed wireless technologies and will play a major role in next-generation wireless communication networks. To share the wireless medium, the IEEE 802.11 standard defines two access methods at the medium access control (MAC) layer: the mandatory distributed coordination function (DCF) and the optional point coordination function (PCF).

DCF uses a carrier sense multiple access with collision avoidance (CSMA/CA) method to decide which station in the network should send the packets out. No coordination is proposed in DCF so many collisions occur, especially in high load WLANs. This causes the WLAN throughput to become worse.

In an infrastructure basic service set (BSS), PCF can be used and the access point (AP) keeps polling the non-AP stations to coordinate access to the wireless medium, but the realization of this is complicated because the AP has to poll the non-AP stations for the transmission of each polled packet. Furthermore, it is difficult to integrate an effective power saving mode into it.

In CSMA/CA, stations listen to the wireless medium to determine when it is free. Once a station detects that the medium is free, it begins to decrement its back-off counter. Each station maintains a contention window (CW) that is used to determine the number of slot times a station has to wait before transmission. The back-off counter only begins to decrement after the medium has been free for a DCF Inter-Frame Space (DIFS) period. If the back-off counter expires and the medium is still free, the station begins to transmit. Thus, it is possible that two stations may begin to transmit at the same time, in which case a collision occurs.

The collisions (or other transmission problems) are detected by the lack of an acknowledgement from the receiver. After the detection of a collision, the station randomly picks a new back-off period from its CW (the CW grows in a binary exponential fashion) and then attempts to gain control of the medium again. Due to collisions and the binary back-off mechanism, there are no transmit guarantees with DCF and, as described above, these problems are made worse by the lack of coordination available with the use of DCF.

SUMMARY OF THE INVENTION

In accordance with the present invention, a method and system for providing a priority-based, low-collision distributed coordination function (DCF) are provided. In particular, a back-off time is selected based on a priority for the station, thereby allowing the high priority station a greater probability of successful transmission as compared to a low priority station.

According to one embodiment of the present invention, a method for providing a priority-based, low-collision DCF in a wireless network is provided. The network includes an access point and a plurality of stations. The method includes receiving a super-frame from the access point at a first station. The super-frame is operable to define a service period for each of the stations. A priority for the first station is determined based on the super-frame. A back-off time is selected for the first station based on the priority.

According to another embodiment of the present invention, a method for providing a priority-based, low-collision DCF in a wireless network comprising a plurality of stations is provided. The method includes estimating a load for each of the plurality of stations. A service period is allocated for each station based on the corresponding estimated load.

According to yet another embodiment of the present invention, a system for providing a priority-based, low-collision DCF in a wireless network comprising a plurality of stations is provided. The system includes an access point that is operable to estimate a load for each of the plurality of stations, to allocate a service period for each station based on the corresponding estimated load, and to broadcast a super-frame comprising the service period information. Each of the plurality of stations is operable to receive the super-frame from the access point.

Technical advantages of one or more embodiments of the present invention include providing an improved method for providing a low-collision DCF. In a particular embodiment, a priority-based method is used in selecting back-off times. As a result, a station with a high priority status selects a back-off time from a shorter contention window, while a station with a low priority status selects a back-off time from a longer contention window. Accordingly, the high priority station is more likely to be able to acquire the right to access the medium than the low priority station.

In another particular embodiment, an access point estimates loads for the stations in the network and allocates service periods to the stations based on the estimated loads. The allocated service periods are provided to the stations in a super-frame that is defined to include service periods for the access point and the other stations. Each station is a high priority station during its own service period and is a low priority station otherwise.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented for any suitably arranged wireless station.

Figure 1:
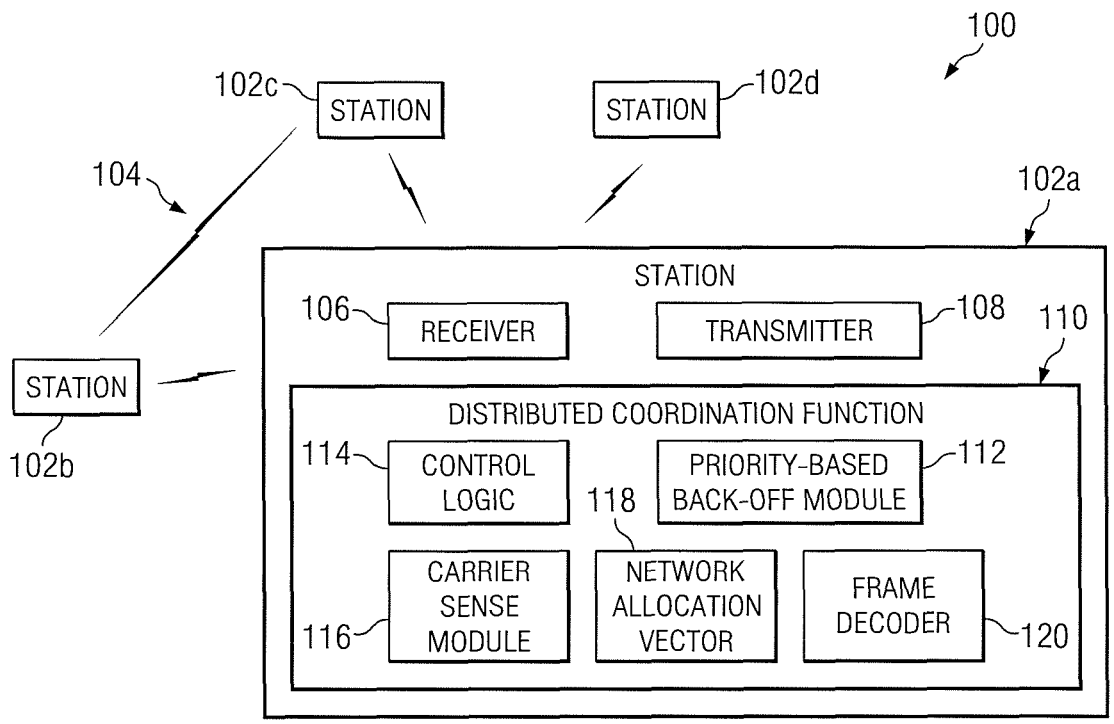
FIG. 1 is a block diagram illustrating a system for providing a priority-based, low-collision distributed coordination function (DCF) in accordance with one embodiment of the present invention.

FIG. 1 is a block diagram illustrating a system 100 for providing a priority-based, low-collision distributed coordination function (DCF) in accordance with one embodiment of the present invention. The system 100 comprises a basic service set (BSS). The BSS may be an independent BSS or an infrastructure BSS.

The system 100 comprises a plurality of stations 102 that are each operable to communicate with other stations 102 over a wireless medium 104. As used herein, "each" means every one of at least a subset of the identified items. It will be understood that one of the stations 102 may comprise an access point for the embodiment in which the system 100 comprises an infrastructure BSS. For this embodiment, the stations 102 are operable to communicate with other stations 102 through the access point.

The station 102a is illustrated in detail; however, it will be understood that the components illustrated in the station 102a are also implemented in the other stations 102b-d. In addition, although the illustrated embodiment includes four stations 102a-d, it will be understood that the system 100 may comprise any suitable number of stations 102 without departing from the scope of the present invention.

Each station 102 comprises a receiver 106, a transmitter 108, and a DCF 110. It will be understood that the station 102 may comprise any other suitable components without departing from the scope of the present invention. The receiver 106 is operable to receive data from other stations 102 over the wireless medium 104, and the transmitter 108 is operable to transmit data to other stations 102 over the wireless medium 104.

The DCF 110 is operable to determine when the station 102 should attempt to transmit data and, based on that determination, to notify the transmitter 108 to begin transmitting. The DCF 110 comprises a priority-based back-off module 112, control logic 114, a carrier sense module 116, a network allocation vector 118, and a frame decoder 120. It will be understood that the DCF 110 may comprise any other suitable components without departing from the scope of the present invention.

The priority-based back-off module 112 is operable to maintain a back-off timer for use in determining a transmit time for the station 102. The length of the back-off timer is based on a priority for the station 102, as described in more detail below.

The control logic 114 is operable to determine that the station 102 is ready to transmit data, to determine that the medium 104 is likely to be available, to determine that the back-off timer has expired, and to enable the station 102 to transmit the data when the medium 104 is likely to be available and the back-off timer has expired. The carrier sense module 116 is operable to sense the medium 104, or carrier, in order to determine whether or not the medium 104 is busy or idle. The network allocation vector 118 is operable to predict future traffic on the medium 104 based on information provided by the frame decoder 120.

The frame decoder 120 is operable to determine whether data received at the receiver 106 has the station 102 as its destination and to decode duration information in the received data or the next high priority station information. For one embodiment, the duration information relates to the wireless medium time owned by the station of the current transmission opportunity owner. Thus, for example, the duration information may comprise a total medium occupied time of frames, a remaining medium occupied time of frames or any other suitable value operable to identify how much longer the medium 104 will be busy with the data currently being received.

In operation, according to one embodiment, the transmitter 108 generates a "transmit ready" signal when the station 102 is ready to transmit data and provides that signal to the control logic 114. Thus, for this embodiment, the control logic 114 determines that the station 102 is ready to transmit data based on the receipt of the "transmit ready" signal from the transmitter 108.

The frame decoder 120 decodes duration information from data received at the receiver 106 and provides the duration information to the network allocation vector 118. Based on the duration information, the network allocation vector 118 predicts future traffic on the medium 104. The prediction is provided to the carrier sense module 116 in the form of a predicted medium state. For example, the network allocation vector 118 may provide a Logic 1 value to the carrier sense module 116 when the network allocation vector 118 predicts that the medium 104 is busy and a Logic 0 value when it predicts that the medium 104 is idle. It will be understood that the network allocation vector 118 may otherwise notify the carrier sense module 116 of its prediction without departing from the scope of the present invention.

The carrier sense module 116 senses the medium 104 to determine a sensed medium state. When the carrier sense module 116 determines that the sensed medium state is idle and the network allocation vector 118 provides the carrier sense module 116 with a predicted medium state of idle, the carrier sense module 116 notifies the control logic 114 that the medium 104 is idle.

In this embodiment, the control logic 114 determines that the medium 104 is likely to be available based on this notification received from the carrier sense module 116. The control logic 114 then activates the priority-based back-off module 112. The back-off module 112 randomly selects a back-off time from one of at least two contention windows that provide minimum and maximum back-off times. The contention window from which the back-off time is selected is determined based on a priority for the station 102. For example, for one embodiment, the station 102 may be in either a high priority state or a low priority state. In this case, the back-off module 112 randomly selects a back-off time from a high priority contention window if the station 102 is in the high priority state and randomly selects a back-off time from a low priority contention window if the station 102 is in the low priority state.

If the control logic 114 tells the back-off module 112 that the medium 104 is idle for a time slot, the randomly selected back-off time is decremented by 1. After the randomly selected back-off time becomes 0, the back-off module 112 notifies the control logic 114 that the back-off timer has expired, and the control logic 114 enables the station 102 to transmit the data. For example, the control logic 114 may provide a "transmit clear" signal to the transmitter 108.

After the data is transmitted, if an acknowledgement is not received at the receiver 106 within a specified period of time, the control logic 114 may re-activate the back-off module 112, which will randomly select another back-off time, and provide another "transmit clear" signal to the transmitter 108 if the medium 104 is still idle once the back-off timer expires again. In this way, the control logic 114 may prompt the transmitter 108 to re-transmit data that may have been lost due to collisions or other transmission problems.

After unsuccessful data transmission or the wireless medium 104 changing from idle to busy, the control logic 114 may notify the back-off module 112 to change the priority from high priority to low priority.

Figure 2:
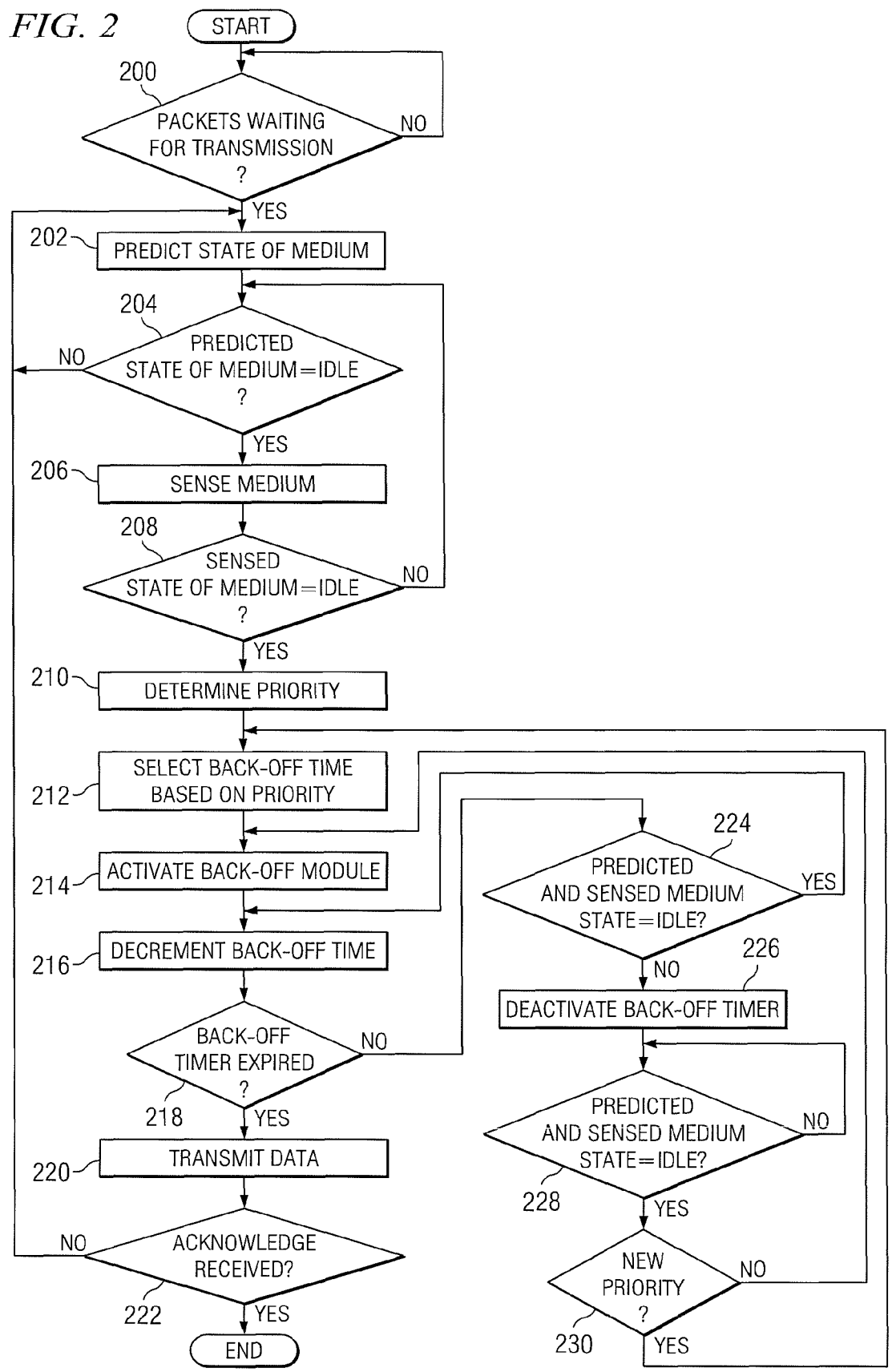
FIG. 2 is a flow diagram illustrating a method for providing a priority-based, low-collision DCF in accordance with one embodiment of the present invention.

FIG. 2 is a flow diagram illustrating a method for providing a priority-based, low-collision DCF in accordance with one embodiment of the present invention. The method begins at decisional step 200 where the control logic 114 determines whether there are any packets in the MAC layer waiting for transmission. If no packet is waiting for transmission, the method follows the No branch from decisional step 200 and remains at decisional step 200 until a packet is waiting for transmission. If a packet is waiting for transmission, the method follows the Yes branch from decisional step 200 to step 202. At step 202, the network allocation vector 118 predicts the state of the medium 104 and provides the predicted medium state to the carrier sense module 116.

At decisional step 204, the carrier sense module 116 determines whether the predicted medium state provided by the network allocation vector 118 is idle. If the predicted medium state is not idle, the method follows the No branch from decisional step 204 and returns to step 202 where the network allocation vector 118 continues to predict the medium state until the predicted medium state is idle.

Once the predicted medium state is idle, the method follows the Yes branch from decisional step 204 to step 206. At step 206, the carrier sense module 116 senses the medium 104 in order to determine its sensed medium state.

At decisional step 208, the carrier sense module 116 determines whether the sensed medium state of the medium 104 is idle. If the sensed medium state is not idle, the method follows the No branch from decisional step 208 and returns to decisional step 204, where the carrier sense module 116 continues to determine whether the predicted medium state remains idle.

If the sensed medium state is idle, the method follows the Yes branch from decisional step 208 to step 210. At step 210, the priority-based back-off module 112 determines the priority of the station 102. For example, according to one embodiment, the back-off module 112 may determine whether the station 102 is in a high priority state or a low priority state. It will be understood that the station 102 may be in one of more than two priority states without departing from the scope of the present invention. For example, the station 102 may be in one of a high priority state, a medium priority state and a low priority state.

At step 212, the back-off module 112 randomly selects a back-off time for the back-off timer based on the priority of the station 102. Thus, for example, if the station 102 is in a high priority state, the back-off module 112 may select a back-off time from a high priority contention window. However, if the station 102 is in a low priority state, the back-off module 112 may select a back-off time from a low priority contention window, which is longer than the high priority contention window. At step 214, the control logic 114 activates the back-off module 112 because the medium 104 is idle. At step 216, the back-off time for the back-off timer is decremented by 1.

At decisional step 218, the back-off module 112 determines whether or not the back-off timer has expired. If the back-off timer has expired, the method follows the Yes branch from decisional step 218 to step 220.

At step 220, the control logic sends a "transmit request" signal to the transmitter 108. After it receives a "transmit ready" signal from the transmitter 108, the control logic 114 provides the "transmit clear" signal to the transmitter 108, which transmits the data across the medium 104.

At decisional step 222, the control logic 114 determines whether an acknowledgement has been received in response to the transmitted data. If no acknowledgement has been received, the method follows the No branch from decisional step 222 and returns to step 202 where the state of the medium 104 is predicted. However, if an acknowledgement has been received, the method follows the Yes branch from decisional step 222 and comes to an end.

Returning to decisional step 218, if the back-off timer has not expired, the method follows the No branch from decisional step 218 to decisional step 224. At decisional step 224, after one time slot, the control logic 114 determines whether the predicted and sensed medium states are still idle based on the signal from the carrier sense module 116, which continues to provide an updated signal based on the predicted medium state received from the network allocation vector 118 and based on the sensed medium state sensed by the carrier sense module 116.

If the predicted and sensed medium states are still idle, the method follows the Yes branch from decisional step 224 and returns to step 216 where the back-off time is again decremented by 1. However, if the predicted and sensed medium states are not still idle, the method follows the No branch from decisional step 224 to step 226. At step 226, the control logic 114 deactivates the back-off module 112.

At decisional step 228, the control logic 114 determines whether the predicted and sensed medium states are idle again based on the signal from the carrier sense module 116, which continues to provide an updated signal based on the predicted medium state received from the network allocation vector 118 and based on the sensed medium state sensed by the carrier sense module 116.

If the predicted and sensed medium states are still busy, the method follows the No branch and remains at decisional step 228 until they are idle. If the predicted and sensed medium states are idle again, the method follows the Yes branch from decisional step 228 to decisional step 230.

At decisional step 230, the control logic 114 determines whether the station 102 has a new priority. If the station 102 has the same priority as before, the method follows the No branch from decisional step 230 and returns to step 214 where the back-off module 112 is activated again. If the station 102 does have a new priority, the method follows the Yes branch from decisional step 230 and returns to step 212 where a back-off time is selected based on the new priority.

Figure 3:
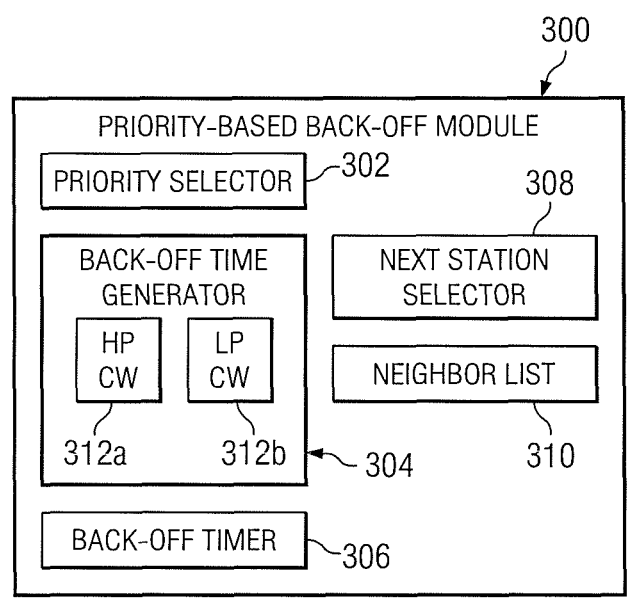
FIG. 3 is a block diagram illustrating the priority-based back-off module of FIG. 1 for use in an independent basic service set (BSS) in accordance with one embodiment of the present invention.

FIG. 3 is a block diagram illustrating a priority-based back-off module 300 in accordance with one embodiment of the present invention. The back-off module 300 may be used as the back-off module 112 when the system 100 comprises an independent BSS.

The back-off module 300 comprises a priority selector 302, a back-off time generator 304, a back-off timer 306, a next station selector 308, and a neighbor list 310. It will be understood that the back-off module 300 may comprise any other suitable components without departing from the scope of the present invention.

The priority selector 302 is operable to select a priority for the station 102 based on a station identifier received from another station 102. According to one embodiment, high priority station identification information carried in a data packet or other packet may be transmitted by a station 102 as it is releasing its rights to access the medium 104. The high priority station identification information comprises a station identifier that is operable to identify another station 102 as the high priority station.

For this embodiment, the priority selector 302 is operable to select a low priority for the station 102 until the station 102 receives high priority station identification information with a station identifier that identifies that particular station 102. When the station identifier identifies the station 102, the station 102 is the high priority station 102 until it releases its rights to access the medium 104 and transmits high priority station identification information that identifies another station 102 as the high priority station.

If the high priority station is in a back-off procedure and the wireless medium 104 becomes busy, the high priority station fails to win the wireless medium access right. If the packet transmission is not successful or the high priority station fails to win the medium access right, the control logic 114 will notify the priority selector 302 to change its priority to low priority.

The back-off time generator 304 comprises a plurality of contention windows 312 and is operable to generate a back-off time for the back-off timer 306 based on the priority of the station 102 as determined by the priority selector 302. According to one embodiment, the back-off time generator 304 comprises a high priority contention window (HP CW) 312a and a low priority contention window (LP CW) 312b, with the low priority contention window 312b having longer minimum and maximum contention windows compared to the high priority contention window 312a.

The back-off time generator 304 is operable to randomly select a back-off time from a contention window 312 corresponding to the priority of the station 102. Thus, when the priority selector 302 determines that the station 102 is in a high priority state, the back-off time generator 304 is operable to randomly select a back-off time from the high priority contention window 312a. Similarly, when the priority selector 302 determines that the station 102 is in a low priority state, the back-off time generator 304 is operable to randomly select a back-off time from the low priority contention window 312b.

Although this embodiment includes two contention windows 312, it will be understood that the back-off time generator 304 may comprise any suitable number of contention windows 312 corresponding to the number of possible priorities for the station 102 without departing from the scope of the present invention.

The next station selector 308 of the station 102 of the current transmission opportunity owner is operable to select the next station 102 that is to be the high priority station 102 after the current high priority station 102 releases its rights to access the medium 104. The next station selector 308 is also operable to provide high priority station identification information that includes a station identifier corresponding to the selected next station 102 for transmission to the other stations 102.

As described in more detail below, the next station selector 308 is operable to use the neighbor list 310 in order to make the determination of which station 102 should be the next high priority station. The neighbor list 310 comprises a list of the one-hop neighbors of the station 102. The next station selector 308 may use a weight-based algorithm, a probability-based algorithm, or any other suitable algorithm in order to select the next high priority station.

For one embodiment in which the next station selector 308 uses a weight-based algorithm, a selection weight calculation interval (SWCI) is defined. After each SWCI, the selection weight of each station 102 in the neighbor list 310 is calculated based on each station's estimated load. The SWCI comprises a multiple or a submultiple of the beacon interval of the independent BSS.

Each station 102 counts the transmit opportunity (TXOP) number of its one-hop neighbors in each SWCI. For example, assume the current SWCI is the $n^{th}$ SWCI. After a station 102 receives a TXOP-ending data frame, the station 102 decides if the source station 102 is in its neighbor list 310. If the source station 102 is not in the neighbor list 310, that station 102 is put in the neighbor list 310, and the number of the newly added neighbors ($N_{new}$) in the $n^{th}$ SWCI increases by one. If the source station 102 is in the neighbor list 310, the TXOP number ($NUM_j^n$) of this station 102 in the $n^{th}$ SWCI increases by one.

At the end of the $n^{th}$ SWCI, each neighbor added to the neighbor list 310 in the $n^{th}$ SWCI will be assigned a weight as follows:

$$W_{new} = \frac{\text{total\_weight}}{N_{new} + N_{old}},$$

where $W_{new}$ is the weight allocated to the newly added neighbors in the $n^{th}$ SWCI, $N_{new}$ is the total number of the newly added neighbors in the $n^{th}$ SWCI, and $N_{old}$ is the total number of neighbors added before the end of the $(n-1)^{th}$ SWCI.

For each neighbor added to the neighbor list 310 before the end of the $(n-2)^{th}$ SWCI, its load in the $(n+1)^{th}$ SWCI is estimated as follows:

$$NUM_j^{n+1}=NUM_j^{n-1}*\partial+NUM_j^{n}*(1-\partial),$$

where $NUM_j^n$ is the load of the neighbor j in the $n^{th}$ SWCI and $\partial$ is the moving average parameter.

For each neighbor added to the neighbor list 310 in the $(n-1)^{th}$ SWCI, its load in the $(n+1)^{th}$ SWCI is estimated as follows:

$$NUM_j^{n+1}=NUM_j^n,$$

where $NUM_j^n$ is the load of the neighbor j in the $n^{th}$ SWCI.

The weight of the neighbor j added before the end of the $(n-1)^{th}$ SWCI is allocated according to:

$$W_j^{n+1} = \frac{(total\_weight - NW_{new}) * NUM_j^{n+1}}{NUM_{total}^{n+1}},$$

where $W_j^{n+1}$ is the weight allocated to neighbor j in the $(n+1)^{th}$ SWCI, $NW_{new}$ is the total weight allocated to the added neighbors in the $n^{th}$ SWCI, $NUM_j^{n+1}$ is the estimated load of neighbor j in the $(n+1)^{th}$ SWCI, and $NUM_{total}^{n+1}$ is the total load of the neighbors added to the neighbor list 310 before the end of the $(n-1)^{th}$ SWCI.

The neighbors are selected by a round robin method based on the weight allocated to each neighbor. Thus, if the number of TXOP selected by the station 102 equals the weight allocated to the neighbor, the next neighbor in the neighbor list 310 is selected.

For one embodiment in which the next station selector 308 uses a probability-based algorithm, a selection probability calculation interval (SPCI) is defined. After each SPCI, the selection probability of each station 102 in the neighbor list 310 is calculated based on each station's estimated load. The SPCI comprises a multiple or a submultiple of the beacon interval of the independent BSS.

Each station 102 counts the TXOP number of its one-hop neighbors in each SPCI. For example, assume the current SPCI is the $n^{th}$ SPCI. After a station 102 receives a TXOP-ending data frame, the station 102 decides if the source station 102 is in its neighbor list 310. If the source station 102 is not in the neighbor list 310, that station 102 is put in the neighbor list 310, and the number of the newly added neighbors ($N_{new}$) increases by one. If the source station 102 is in the neighbor list 310, the TXOP number ($NUM_j^n$) of this station 102 in the $n^{th}$ SPCI increases by one.

At the end of the $n^{th}$ SPCI, each neighbor added to the neighbor list 310 in the $n^{th}$ SPCI will be assigned a probability as follows:

$$P_{new} = \frac{total\_probability}{N_{new} + N_{old}},$$

where $P_{new}$ is the probability allocated to the newly added neighbors in the $n^{th}$ SPCI, total_probability is the total probability one station 102 can allocate to its neighbors, $N_{new}$ is the total number of the newly added neighbors in the $n^{th}$ SPCI, and $N_{old}$ is the total number of the neighbors added before the end of the $(n-1)^{th}$ SPCI.

For each neighbor added to the neighbor list 310 before the end of the $(n-2)^{th}$ SPCI, its load in the $(n+1)^{th}$ SPCI is estimated as follows:

$$NUM_j^{n+1}=NUM_j^{n-1}*\partial+NUM_j^{n}*(1-\partial),$$

where $NUM_j^n$ is the load of the neighbor j in the $n^{th}$ SPCI and $\partial$ is the moving average parameter.

For each neighbor added to the neighbor list 310 in the $(n-1)^{th}$ SPCI, its load in the $(n+1)^{th}$ SPCI is estimated as follows:

$$NUM_j^{n+1}=NUM_j^n,$$

where $NUM_j^n$ is the load of the neighbor j in the $n^{th}$ SPCI.

The probability of the neighbor j added before the end of the $(n-1)^{th}$ SPCI is allocated according to:

$$P_j^{n+1} = \frac{(total\_probability - NP_{new}) * NUM_j^{n+1}}{NUM_{total}^{n+1}},$$

where $P_j^{n+1}$ is the probability allocated to the neighbor j in the $(n+1)^{th}$ SPCI, $NP_{new}$ is the total probability allocated to the added neighbors in the $n^{th}$ SPCI, $NUM_j^{n+1}$ is the estimated load of neighbor j in the $(n+1)^{th}$ SPCI, and $NUM_{total}^{n+1}$ is the total load of neighbors added to the neighbor list 310 before the $n^{th}$ SPCI.

The neighbors are selected based on the probability allocated to each neighbor. Thus, each neighbor has a low probability threshold and a high probability threshold. After its TXOP, the station 102 creates a random number that is smaller than 1 and larger than 0. If the random number is in the range of one neighbor's low probability threshold and high probability threshold, this neighbor is selected as the next high priority station.

Figure 4:
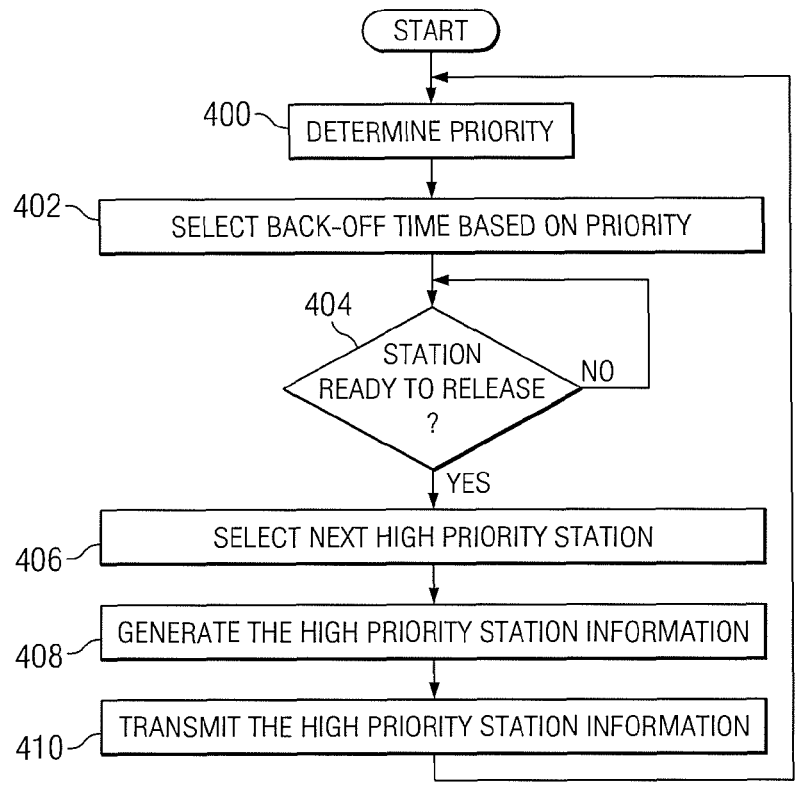
FIG. 4 is a flow diagram illustrating a method for providing a priority-based, low-collision DCF using the back-off module of FIG. 3 in accordance with one embodiment of the present invention.

FIG. 4 is a flow diagram illustrating a method for providing a priority-based, low-collision DCF using the back-off module 300 in accordance with one embodiment of the present invention. The method begins at step 400 where the priority selector 302 determines the priority of the station 102. For example, the priority selector 302 determines the priority based on a station identifier received in high priority station identification information carried by a data or other packet received from another station 102. The high priority station identification information comprises a station identifier that is operable to identify a station 102 as the high priority station. For this embodiment, the priority selector 302 determines that the station 102 is in a high priority state when the high priority station identification information has a station identifier that identifies that particular station 102. Otherwise, the priority selector 302 determines that the station 102 is in a low priority state.

At step 402, the back-off time generator 304 randomly selects any back-off times needed for the back-off timer 306 using the high priority contention window 312a or the low priority contention window 312b based on the station's priority.

At decisional step 404, a determination is made regarding whether the station 102 is ready to release its rights to access the medium 104. If the station 102 is not ready to release its rights, the method follows the No branch from decisional step 404 and remains at decisional step 404 until the station 102 is ready to release its rights.

When the station 102 is ready to release its rights to access the medium 104, the method follows the Yes branch from decisional step 404 to step 406. At step 406, the next station selector 308 selects the next high priority station using the neighbor list 310. The next station selector 308 may select the next high priority station with a weight-based algorithm, a probability-based algorithm, or any other suitable algorithm.

At step 408, the station 102 generates high priority station identification information that includes the station identifier for the next high priority station selected in step 406. At step 410, the station 102 transmits the high priority station identification information carried by a data packet or other packet, and the method returns to step 400 where the priority selector 302 again determines the priority of the station 102.

Figure 5:
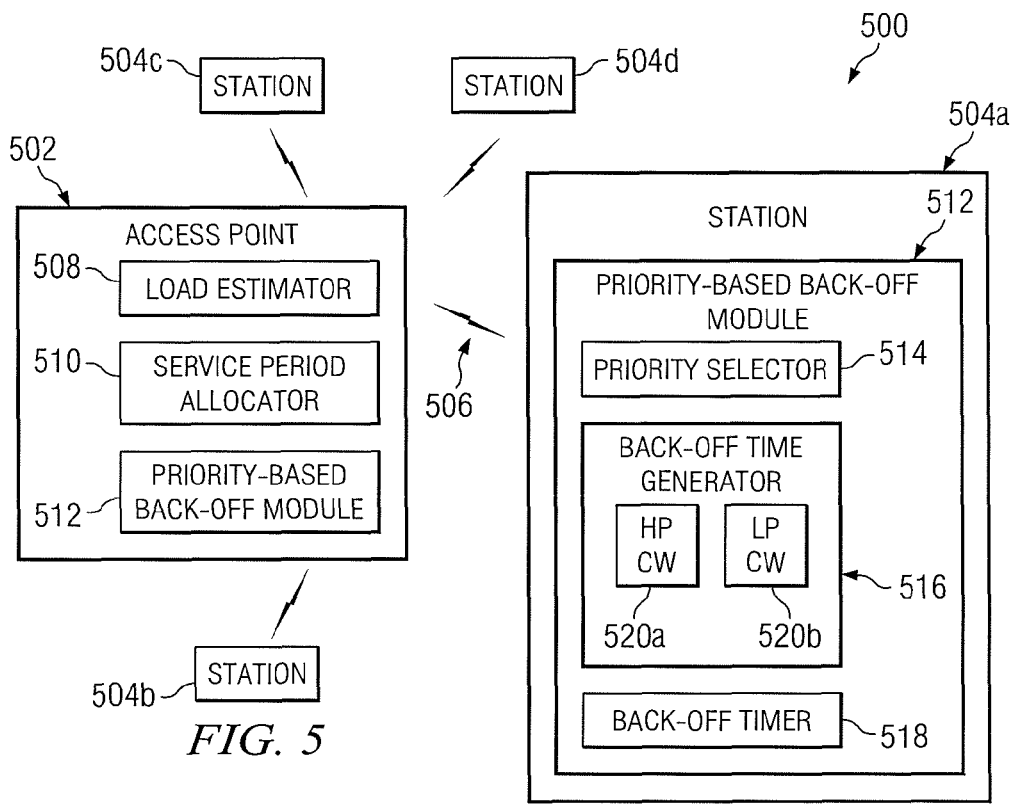
FIG. 5 is a block diagram illustrating a system for providing a priority-based, low-collision DCF for use in an infrastructure BSS in accordance with one embodiment of the present invention.

FIG. 5 is a block diagram illustrating a system 500 for providing a priority-based, low-collision DCF in accordance with one embodiment of the present invention. For this embodiment, the system 500 comprises an infrastructure BSS. The system 500 comprises an access point 502 and a plurality of stations 504 that are operable to communicate with each other over a wireless medium 506.

The system 500 is operable to provide the stations 504 and the access point 502 with access to the medium 506 based on a super-frame, low collision DCF. For this embodiment, a super-frame is defined that is a submultiple of the beacon interval. The super-frame comprises a service period for the access point 502 and a service period for each station 504. The length of each service period is based on the load of the corresponding station 504 and the access point 502.

The access point 502 comprises a load estimator 508 and a service period allocator 510. It will be understood that the access point 502 may comprise any other suitable components without departing from the scope of the present invention. The load estimator 508 is operable to estimate the load of each station 504 and the access point 502, and the service period allocator 510 is operable to allocate service periods in the super-frame to each station 504 and the access point 502 according to each station's load.

The access point 502 is also operable to transmit a broadcast management message with service period information to each station 504. The service period information comprises a service start time and a service end time relative to the super-frame start time for each station 504 and the access point 502.

The station 504a is illustrated in detail; however, it will be understood that the components illustrated in the station 504a are also implemented in the other stations 504b-d and the access point 502. In addition, although the illustrated embodiment includes four stations 504a-d, it will be understood that the system 500 may comprise any suitable number of stations 504 without departing from the scope of the present invention.

Each station 504 and the access point 502 comprise a priority-based back-off module 512. The back-off module 512 may be used as the back-off module 112 when the system 100 comprises an infrastructure BSS, such as the system 500. It will be understood that the stations 504 and the access point 502 may comprise any other suitable components, such as those described in connection with the stations 102 of FIG. 1, without departing from the scope of the present invention.

The back-off module 512 comprises a priority selector 514, a back-off time generator 516, and a back-off timer 518, in addition to any other suitable components. The priority selector 514 is operable to select a priority for the station 504 and the access point 502 based on the service period allocation provided by the access point 502.

For one embodiment, the priority selector 514 is operable to select a high priority for the station 504 and the access point 502 during the service period for that station 504 and the access point 502. Otherwise, the priority selector 514 is operable to select a low priority for the station 504 and the access point 502.

The back-off time generator 516 comprises a plurality of contention windows 520 and is operable to generate a back-off time for the back-off timer 518 based on the priority of the station 504 or the access point 502 as determined by the priority selector 514. According to one embodiment, the back-off time generator 516 comprises a high priority contention window (HP CW) 520a and a low priority contention window (LP CW) 520b, with the low priority contention window 520b having longer minimum and maximum contention windows compared to the high priority contention window 520a.

The back-off time generator 516 is operable to randomly select a back-off time from a contention window 520 corresponding to the priority of the station 504 or the access point 502. Thus, when the priority selector 514 determines that the station 504 or the access point 502 is in a high priority state, the back-off time generator 516 is operable to randomly select a back-off time from the high priority contention window 520a. Similarly, when the priority selector 514 determines that the station 504 or the access point 502 is in a low priority state, the back-off time generator 516 is operable to randomly select a back-off time from the low priority contention window 520b.

Although this embodiment includes two contention windows 520, it will be understood that the back-off time generator 516 may comprise any suitable number of contention windows 520 corresponding to the number of possible priorities for the station 504 and the access point 502 without departing from the scope of the present invention.

For one embodiment, after the high priority station 504 or the high priority access point 502 gets the right to access the medium 506 through the back-off process, the high priority station 504 or the high priority access point 502 may continue to transmit all the frames buffered in its queue if the frames are transmitted correctly until all the buffered frames are transmitted or until its service period comes to an end. If the required response (such as an acknowledgement frame) is not received correctly, the back-off process may be used to acquire the right to access the medium 506 again. If there are no buffered frames in the high priority station 504 or the high priority access point 502 and there are some packets coming from an upper layer after some time, the station 504 or the access point 502 may use the back-off process to acquire the right to access the medium 506 again. Alternatively, if a station 504 or the access point 502 becomes the high priority station and the medium 506 stays idle for one DCF Inter-Frame Space (DIFS), the station 504 or the access point 502 may acquire the right to access the medium 506 without performing the back-off process.

The access point 502 comprises the central control point in this system 500. At the end of a load estimation interval (LEI), which comprises a multiple of the super-frame, the load estimator 508 estimates the load of each station 504 and the access point 502, and the service period allocator 510 allocates a service period to each station 504 and the access point 502 according to its load. Then the access point 502 sends a broadcast management message that includes the service period information of each station 504 and the access point 502.

The access point 502 resolves all the transmitted packets belonging to its BSS and adds the medium time to the source station 504 or the access point 502. If one station 504 or the access point 502 starts to send packets in this load estimation interval, the access point 502 marks it as a newly added station 504 or the newly added access point 502.

Assume the current LEI is the $n^{th}$ LEI. For the newly added station 504 or the newly added access point 502 in the $n^{th}$ LEI, the access point 502 allocates the service period for the $(n+1)^{th}$ LEI at the end of the $n^{th}$ LEI as follows:

$$SP_{new}^{n+1} = \frac{SF}{N_{new} + N_{old}},$$

where $SP_{new}^{n+1}$ is the service period allocated to the newly added station 504 or the newly added access point 502, SF is the medium time of the super-frame that the access point 502 can allocate to all the stations 504 and the access point 502 that are in the BSS, $N_{new}$ is the total number of newly added stations 504 and the newly added access point 502 in the $n^{th}$ LEI, and $N_{old}$ is the total number of stations 504 or the access point 502 added before the end of the $(n-1)^{th}$ LEI.

For each station 504 or the access point 502 added to the BSS before the end of the $(n-2)^{th}$ LEI, its load in the $(n+1)^{th}$ LEI is estimated as follows:

$$MT_j^{n+1} = MT_j^{n-1} * \partial + MT_j^n * (1-\partial),$$

where $MT_j^n$ is the load of station j in the $n^{th}$ LEI and $\partial$ is the moving average parameter.

For each station 504 or the access point 502 added to the BSS in the $(n-1)^{th}$ LEI, its load in the $(n+1)^{th}$ LEI is estimated as follows:

$$MT_j^{n+1} = MT_j^n,$$

where $MT_j^n$ is the load of station j in the $n^{th}$ LEI.

If the estimated load of station j in the next LEI is lower than the mean load, the access point 502 allocates the service period of station j as follows:

$$SP_j^{n+1} = \frac{\text{factor} * MT_j^{n+1}}{\text{loadEstInterval}},$$

where $SP_j^{n+1}$ is the service period allocated to station j in the $(n+1)^{th}$ LEI and loadEstInterval is the load estimation interval.

If the estimated load of station j in the next LEI is larger than mean load, the access point 502 allocates the service period of station j as follows:

$$SP_j^{n+1} = (SF - SP_{new}^{n+1} - SP_{low\_load}^{n+1}) * \frac{MT_j^{n+1}}{\sum_{i \in high\_load\_STA\_SET} MT_i^{n+1}},$$

where $SP_{new}^{n+1}$ is the service period of all the newly added stations 504 and the newly added access point 502 in the $n^{th}$ LEI and $SP_{low\_load}^{n+1}$ is the service period of all the low-load stations 504 and the low-load access point 502.

Using the system 500, an effective power saving mode may be implemented according to one embodiment. If a station 504 is in a power saving mode, that station 504 becomes active only during its own service period and during the service period of the access point 502. At other times, the station 504 is in a sleep state. If a station 504 is in the power saving mode, another station 504 may send frames for that station 504 to the access point 502 instead of sending the frames directly to the destination station 504. The access point 502 may then forward these frames to the destination station 504. Thus, no direct link protocol is established with a station 504 that is in the power saving mode for this embodiment.

Figure 6:
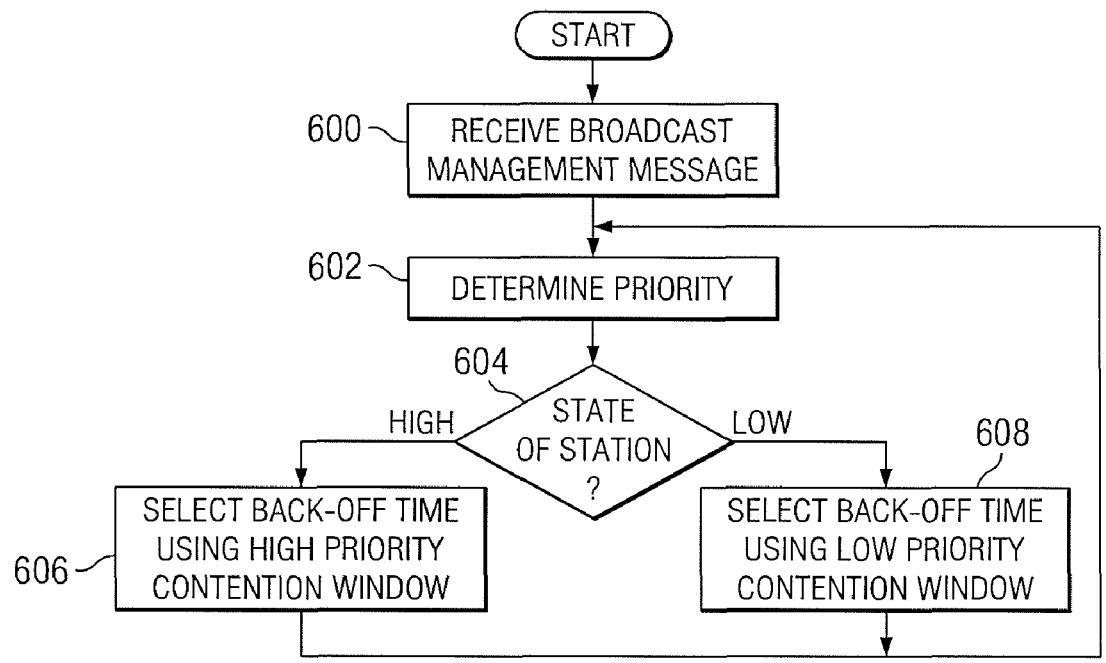
FIG. 6 is a flow diagram illustrating a method for providing a priority-based, low-collision DCF from the perspective of the station of FIG. 5 in accordance with one embodiment of the present invention.

FIG. 6 is a flow diagram illustrating a method for providing a priority-based, low-collision DCF from the perspective of the station 504 or the access point 502 in accordance with one embodiment of the present invention. The method begins at step 600 where the back-off module 512 receives a broadcast management message from the access point 502.

At step 602, the priority selector 514 determines a priority for the station 504 or the access point 502 based on the broadcast management message, which identifies the service periods for the access point 502 and all the stations 504 in each super-frame. Thus, if the priority selector 514 determines that it is currently within a service period for its own station 504 or the access point 502, the priority selector 514 determines that the station 504 or the access point 502 is in a high priority state. Otherwise, the priority selector 514 determines that the station 504 or the access point 502 is in a low priority state.

At decisional step 604, a determination is made regarding whether the station 504 or the access point 502 is in a high priority state or a low priority state. If the station 504 or the access point 502 is in a high priority state, the method follows the High branch from decisional step 604 to step 606. At step 606, the back-off time generator 516 randomly selects any back-off times needed for the back-off timer 518 using the high priority contention window 520a.

Returning to decisional step 604, if the station 504 or the access point 502 is in a low priority state, the method follows the Low branch from decisional step 604 to step 608. At step 608, the back-off time generator 516 randomly selects any back-off times needed for the back-off timer 518 using the low priority contention window 520b.

From steps 606 and 608, the method returns to step 602 where the priority selector 514 again determines the priority of the station 504 or the access point 502 based on the service period allocation provided by the access point 502. It will be understood that the method may be repeated any time that a new broadcast management message is received from the access point 502.

Figure 7:
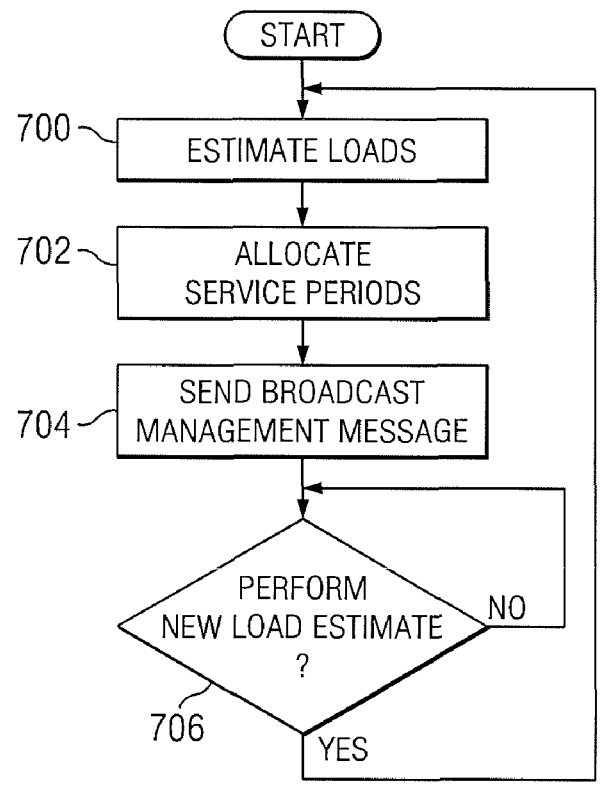
FIG. 7 is a flow diagram illustrating a method for providing a priority-based, low-collision DCF from the perspective of the access point of FIG. 5 in accordance with one embodiment of the present invention.

FIG. 7 is a flow diagram illustrating a method for providing a priority-based, low-collision DCF from the perspective of the access point 502 in accordance with one embodiment of the present invention. The method begins at step 700 where the load estimator 508 of the access point 502 estimates the load of each station 504 and the access point 502. At step 702, the service period allocator 510 of the access point 502 allocates service periods to the access point 502 and to each station 504 based on the estimations of the load estimator 508. At step 704, the access point 502 sends a broadcast management message to the stations 504 that includes the service period information.

At decisional step 706, a determination is made regarding whether or not a new load estimation is to be performed. If a new load estimation is not to be performed, the method follows the No branch from decisional step 706 and remains at decisional step 706 until the access point 502 is ready to perform a new load estimation.

If a new load estimation is to be performed, the method follows the Yes branch from decisional step 706 and returns to step 700 where the load estimator 508 estimates loads for the stations 504 again.

Although the present invention has been described with several embodiments, various changes and modifications may be suggested to one skilled in the art. It is intended that the present invention encompass such changes and modifications as fall within the scope of the appended claims.

What is claimed is:

1. A method for providing a priority-based, low-collision distributed coordination function (DCF) in a wireless network comprising an access point and a plurality of stations, the method comprising:
   receiving at a first station a super-frame from the access point, the super-frame defining a service period for each of the stations;
   determining a priority for the first station based on the super-frame and a current service period, wherein the priority is determined to be a high priority if the current service period is a service period assigned to the first station in the super-frame and the priority is determined to be a low priority if the current service period is a service period assigned to another station in the super-frame; and
   selecting a back-off time for the first station based on the priority, wherein a shorter back-off time is selected if the priority for the first station is the high priority than if the priority for the first station is the low priority.

2. The method of claim 1, further comprising:
   selecting the back-off time from one of at least two contention windows that provide minimum and maximum back-off times.

3. The method of claim 2, further comprising:
   randomly selecting the back-off time from one of the at least two contention windows.

4. The method of claim 1, the priority comprising one of at least three priorities.

5. The method of claim 1, further comprising:
   receiving the super-frame at each of the stations; and
   determining a priority for a plurality of stations, the priority for one of the plurality of stations comprising a high priority and the priority for a remainder of the plurality of stations comprising a low priority.

6. The method of claim 5, further comprising selecting a back-off time for the high priority station from a high priority contention window and selecting a back-off time for at least one of the low priority stations from a low priority contention window.

7. The method of claim 6, the high priority contention window comprising a minimum contention window and a maximum contention window, the low priority contention window comprising a minimum contention window and a maximum contention window, the minimum contention window for the low priority contention window longer than the minimum contention window for the high priority contention window, and the maximum contention window for the low priority contention window longer than the maximum contention window for the high priority contention window.

8. An apparatus, comprising:
   a station configured to receive a super-frame transmitted from a access point during operation of a priority-based, low-collision distributed coordination function (DCF) within the access point, the super-frame defining a service period for each of a plurality of stations in a wireless network comprising the access point and the plurality of stations, the plurality of stations including the station;
   a priority selector configured to determine a priority for the first station based on the super-frame and a current service period, wherein the priority is determined to be a high priority if the current service period is a service period assigned to the first station in the super-frame and the priority is determined to be a low priority if the current service period is a service period assigned to another station in the super-frame; and
   a back-off time configured to select a back-off time for the first station based on the priority, wherein a shorter back-off time is selected if the priority for the first station is the high priority than if the priority for the first station is the low priority.

9. The apparatus of claim 8, wherein the back-off timer is configured to select the back-off time from one of at least two contention windows that provide minimum and maximum back-off times.

10. The apparatus of claim 9, wherein the back-off timer is configured to randomly select the back-off time from one of the at least two contention windows.

11. The apparatus of claim 8, the priority comprising one of at least three priorities.

12. The apparatus of claim 8, wherein the plurality of stations are each configured to receive the super-frame, each station including a priority selector configured to determine a priority for the respective station, the priority for one of the plurality of stations comprising a high priority and the priority for a remainder of the plurality of stations comprising a low priority.

13. The apparatus of claim 12, wherein each station includes a back-off timer configured to select a back-off time, the back-off time for the high priority station selected from a high priority contention window and the back-off time for at least one of the low priority stations selected from a low priority contention window.

14. The apparatus of claim 13, the high priority contention window comprising a minimum contention window and a maximum contention window, the low priority contention window comprising a minimum contention window and a maximum contention window, the minimum contention window for the low priority contention window longer than the minimum contention window for the high priority contention window, and the maximum contention window for the low priority contention window longer than the maximum contention window for the high priority contention window.

15. A method, comprising:
   receiving at a station a super-frame transmitted from a access point during operation of a priority-based, low-collision distributed coordination function (DCF) within the access point, the super-frame defining a service period for each of a plurality of stations in a wireless network comprising the access point and the plurality of stations, the plurality of stations including the station; and
   selecting a back-off time for the station based on whether a current service period is assigned to the station by the super-frame, wherein the station has a high priority if the current service period is assigned to the station and a low priority if the current service period is assigned to another station, wherein a shorter back-off time is selected based on priority if the current service period is assigned to the station and the station has high priority and a longer back-off time is selected based on priority if the current service period is assigned to another of the stations and the station has low priority.

16. The method of claim 15, further comprising:
   selecting the back-off time from one of at least two contention windows that provide minimum and maximum back-off times.

17. The method of claim 16, further comprising:
   randomly selecting the back-off time from one of the at least two contention windows.

18. The method of claim 15, the priority comprising one of at least three priorities.

19. The method of claim 15, further comprising:
demining a priority for a plurality of stations, the priority for one of the plurality of stations comprising a high priority and the priority for a remainder of the stations comprising a low priority.

20. The method of claim 19, further comprising selecting a back-off time for the high priority station from a high priority contention window and selecting a back-off time for at least one of the low priority stations from a low priority contention window.

* * * * *